United States Patent
Tanaka et al.

(10) Patent No.: US 9,330,439 B2
(45) Date of Patent: *May 3, 2016

(54) DISPLAY DEVICE WITH CROSSTALK LEVEL CORRECTION

(71) Applicant: Sharp Kabushiki Kaisha, Osaka-shi, Osaka (JP)

(72) Inventors: Noriyuki Tanaka, Osaka (JP); Takuya Sone, Osaka (JP); Kouji Kumada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 99 days.

This patent is subject to a terminal disclaimer.

(21) Appl. No.: 14/364,358

(22) PCT Filed: Dec. 10, 2012

(86) PCT No.: PCT/JP2012/081954
§ 371 (c)(1),
(2) Date: Jun. 11, 2014

(87) PCT Pub. No.: WO2013/089068
PCT Pub. Date: Jun. 20, 2013

(65) Prior Publication Data
US 2014/0340417 A1 Nov. 20, 2014

(30) Foreign Application Priority Data
Dec. 15, 2011 (JP) .................. 2011-274603

(51) Int. Cl.
*G09G 5/02* (2006.01)
*G06T 5/00* (2006.01)
(Continued)

(52) U.S. Cl.
CPC ............ *G06T 5/001* (2013.01); *G02B 27/2214* (2013.01); *G09G 3/003* (2013.01);
(Continued)

(58) Field of Classification Search
None
See application file for complete search history.

(56) References Cited

U.S. PATENT DOCUMENTS 6,573,928 B1    6/2003  Jones et al.
7,058,252 B2 *  6/2006  Woodgate .......... G02B 27/2214
                                                348/E13.029
(Continued)

FOREIGN PATENT DOCUMENTS

JP    2000-004455 A    1/2000
JP    2004-312780 A    11/2004
(Continued)

OTHER PUBLICATIONS

Official Communication issued in International Patent Application No. PCT/JP2012/081954, mailed on Mar. 12, 2013.

*Primary Examiner* — Ming Hon
*Assistant Examiner* — Khoa Vu
(74) *Attorney, Agent, or Firm* — Keating & Bennett, LLP

(57) ABSTRACT

The purpose of the present invention is to provide a display device in which the occurrence of crosstalk can be suppressed. A display device (10) includes a display unit and a separation unit (34). The display unit displays a synthetic image formed by dividing each of a plurality of images that are different from one another and arraying the divisional images thus obtained in a predetermined order. The separation unit (34) separates the plurality of images contained in the synthetic image. The display unit includes a storage unit (54) and a correction unit (52). The storage unit (54) stores crosstalk levels set with respect to respective combinations of gray scale level data including gray scale level data of a pixel displaying an image that a viewer is supposed to see, among the plurality of images contained in the synthetic image, and gray scale level data of a pixel serving as a factor that causes crosstalk. The correction unit (52) corrects the gray scale level data of the pixel displaying the image that a viewer is supposed to see, by using the crosstalk levels read out of the storage unit (54).

12 Claims, 7 Drawing Sheets

(51) Int. Cl.
  *G09G 3/00* (2006.01)
  *H04N 13/00* (2006.01)
  *G09G 3/36* (2006.01)
  *G02B 27/22* (2006.01)
  *H04N 13/04* (2006.01)

(52) U.S. Cl.
  CPC ........ *G09G 3/3666* (2013.01); *H04N 13/0018* (2013.01); *G09G 2320/0209* (2013.01); *G09G 2320/0271* (2013.01); *G09G 2320/0276* (2013.01); *G09G 2320/0285* (2013.01); *H04N 13/0404* (2013.01); *H04N 13/0409* (2013.01); *H04N 13/0434* (2013.01)

(56) References Cited

U.S. PATENT DOCUMENTS

| | | | | |
|---|---|---|---|---|
| 2004/0240777 | A1* | 12/2004 | Woodgate | G02B 24/2214 385/16 |
| 2005/0156851 | A1* | 7/2005 | Yun | G09G 3/2092 345/98 |
| 2007/0222724 | A1 | 9/2007 | Ueno et al. | |
| 2008/0231547 | A1* | 9/2008 | Yagiura | G09G 3/003 345/4 |
| 2009/0141022 | A1* | 6/2009 | Kimpe | H04N 9/07 345/419 |
| 2009/0303157 | A1 | 12/2009 | Imai et al. | |
| 2011/0141130 | A1* | 6/2011 | Yagiura | G09G 3/003 345/589 |
| 2011/0261029 | A1* | 10/2011 | Moon | G02B 27/2264 345/204 |
| 2012/0013601 | A1* | 1/2012 | Park | G02B 27/2264 345/419 |
| 2012/0044330 | A1* | 2/2012 | Watanabe | G02B 27/2214 348/54 |
| 2012/0113153 | A1* | 5/2012 | Casner | G02B 27/2214 345/690 |

FOREIGN PATENT DOCUMENTS

| | | |
|---|---|---|
| JP | 2006-023710 A | 1/2006 |
| JP | 2010-160383 A | 7/2010 |
| JP | 2011-123230 A | 6/2011 |
| WO | 2007/032132 A1 | 3/2007 |
| WO | 2012/070444 A1 | 5/2012 |

* cited by examiner

DISPLAY DEVICE WITH CROSSTALK LEVEL CORRECTION

TECHNICAL FIELD

The present invention relates to a display device.

BACKGROUND ART

In recent years, a display device that includes a display panel and a parallax barrier has been proposed (see, for example, WO2007/32132, JP2004-312780A). The display panel displays synthetic images. A synthetic image is formed by dividing each of a plurality of images that are different from one another, and arraying the divisional pieces of the images in a predetermined order. The parallax barrier separates the plurality of images contained in the synthetic image so that they are visible from different directions. Such a display device is applied practically in, for example, a stereoscopic display of a digital camera, an on-vehicle dual-view display device, and the like.

In such a display device, however, such a phenomenon that when a viewer views one of a plurality of images, another image is visible to the viewer (i.e., crosstalk) occurs in some cases. This results in a problem that the image that the viewer is supposed to see is not clearly viewed by the viewer.

SUMMARY OF THE INVENTION

Problem to be Solved by the Invention

It is an object of the present invention to provide a display device in which the occurrence of the crosstalk can be suppressed.

A display device of the present invention includes: a display unit that displays a synthetic image formed by dividing each of a plurality of images that are different from one another and arraying the divisional images thus obtained in a predetermined order; and a separation unit that separates the plurality of images contained in the synthetic image, wherein the display unit includes: a storage unit that stores crosstalk levels set with respect to respective combinations of gray scale level data including gray scale level data of a pixel displaying an image that a viewer is supposed to see, among the plurality of images contained in the synthetic image, and gray scale level data of a pixel serving as a factor that causes crosstalk; and a correction unit that corrects the gray scale level data of the pixel displaying the image that a viewer is supposed to see, by using the crosstalk levels stored in the storage unit.

In the display device of the present invention, the occurrence of crosstalk can be suppressed.

DETAILED DESCRIPTION OF THE EMBODIMENTS

Figure 1:
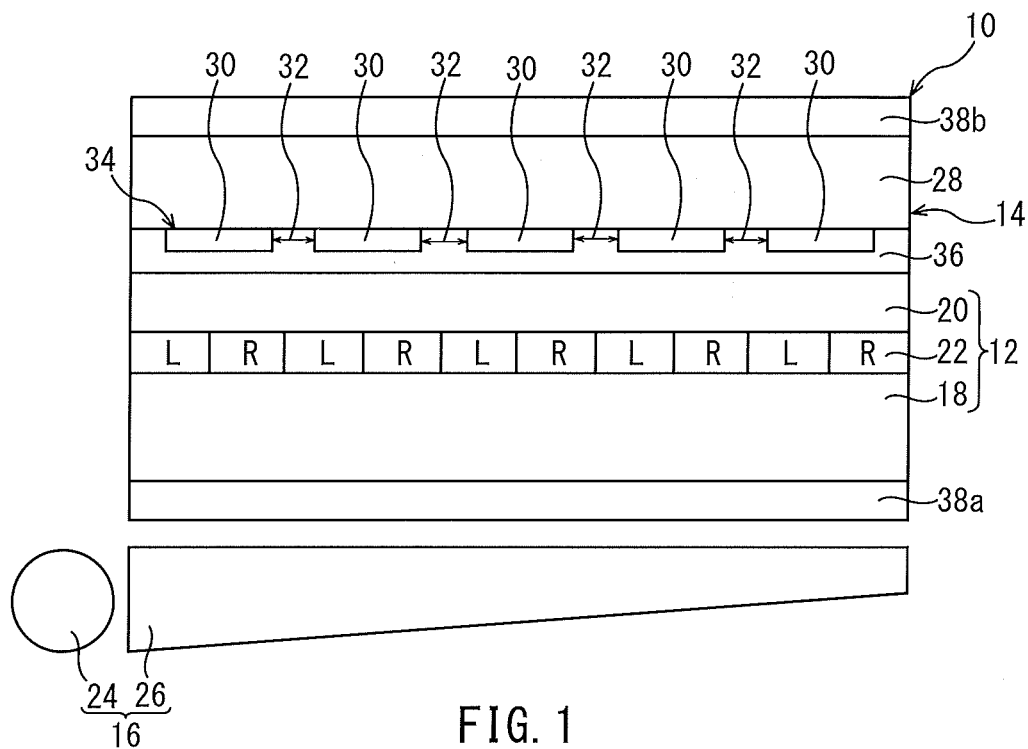
FIG. 1 schematically shows an exemplary schematic configuration of a display device as an embodiment of the present invention.

A display device according to one embodiment of the present invention includes: a display unit that displays a synthetic image formed by dividing each of a plurality of images that are different from one another and arraying the divisional images thus obtained in a predetermined order; and a separation unit that separates the plurality of images contained in the synthetic image, wherein the display unit includes: a storage unit that stores crosstalk levels set with respect to respective combinations of gray scale level data including gray scale level data of a pixel displaying an image that a viewer is supposed to see, among the plurality of images contained in the synthetic image, and gray scale level data of a pixel serving as a factor that causes crosstalk; and a correction unit that corrects the gray scale level data of the pixel displaying the image that a viewer is supposed to see, by using the crosstalk levels stored in the storage unit (the first configuration).

In the first configuration, crosstalk levels are set with respect to combinations of gray scale level data of a pixel displaying an image that a viewer is supposed to see and gray scale level data of a pixel serving as a factor that causes crosstalk. As a result, appropriate crosstalk correction can be performed.

The second configuration is the first configuration modified so that the display unit further includes a calculation unit that calculates gray scale level data of a pixel serving as a factor that causes crosstalk, based on gray scale level data of a pixel adjacent to the pixel displaying the image that a viewer is supposed to see. In the second configuration, gray scale level data of a pixel serving as a factor that causes crosstalk can be changed to an appropriate value. As a result, appropriate crosstalk correction can be performed.

The third configuration is the first or second configuration modified so that the correction unit corrects gray scale level data of the pixel displaying the image that a viewer is supposed to see, by the following equation (1):

$$I_O = I_X + (C+1) \times (I_M - I_X - I_Y - 1)/(I_M + 1) \tag{1}$$

where $I_X$ represents gray scale level data of a pixel displaying an image that a viewer is supposed to see, $I_Y$ represents gray scale level data of a pixel serving as a factor that causes crosstalk, $I_M$ represents a maximum value of the gray scale level data of the pixel displaying the image that a viewer is supposed to see, C represents a crosstalk level, and $I_O$ represents gray scale level data of the pixel after the correction.

The fourth configuration is any one of the first to third configurations modified so that the display unit includes: a determination unit that determines whether the crosstalk level corresponding to the combination of gray scale level data is stored in the storage unit; and a generation unit that, in the case where the determination unit determines that the crosstalk level corresponding to the combination of gray scale level data is not stored in the storage unit, generates the crosstalk level by referring to the crosstalk levels corresponding to the combinations of gray scale level data stored in the storage unit. In the fourth configuration, not all of crosstalk levels corresponding to all of the combinations of gray scale level data, respectively, have to be stored in the storage unit. As a result, the number of crosstalk levels stored in the storage unit can be decreased.

The fifth configuration is the fourth configuration modified so that the generation unit includes: a selection unit that selects a combination of gray scale level data closest to the combination of gray scale level data determined by the determination unit, from the combinations of gray scale level data stored in the storage unit; and a setting unit that sets the crosstalk level corresponding to the combination of gray scale level data selected by selection unit, as the crosstalk level corresponding to the combination of gray scale level data determined by the determination unit. In the fifth configuration, not all of crosstalk levels corresponding to all of the combinations of gray scale level data, respectively, have to be stored in the storage unit. As a result, the number of crosstalk levels stored in the storage unit can be decreased.

The sixth configuration is the fourth configuration modified so that the generation unit includes: a selection unit that selects a plurality of combinations of gray scale level data close to the gray scale level data determined by the determination unit, from the combinations of gray scale level data stored in the storage unit; and a setting unit that sets a value calculated by using the crosstalk levels corresponding to the combinations of gray scale level data selected by the selection unit, as the crosstalk level corresponding the combination of gray scale level data determined by the determination unit. In the sixth configuration, not all of crosstalk levels corresponding to all of the combinations of gray scale level data, respectively, have to be stored in the storage unit. As a result, the number of crosstalk levels stored in the storage unit can be decreased.

The seventh configuration is any one of the first to sixth configurations modified so that the display unit further includes: a display panel that displays the synthetic image; and a confirmation unit that confirms in which area, among a plurality of areas formed in the display panel, a pixel exists that displays an image that a viewer is supposed to see, wherein tables having the crosstalk levels corresponding to the combinations of gray scale level data are provided so as to correspond to the plurality of areas, the storage unit stores the plurality of tables, and the correction unit corrects gray scale level data of the pixel that displays the image that a viewer is supposed to see, by using the crosstalk level selected from the table corresponding to the area where the confirmation unit confirms the pixel that displays the image that a viewer is supposed to see exists, among the plurality of areas. In the seventh configuration, more appropriate crosstalk correction can be performed.

The eighth configuration is any one of the first to seventh configurations modified so that the crosstalk level is categorized as: a first crosstalk level used for correcting gray scale level data of a pixel displaying an image that a viewer is supposed to see in a first direction; or a second crosstalk level used for correcting gray scale level data of a pixel displaying an image that a viewer is supposed to see in a second direction. In the eighth configuration, more appropriate crosstalk correction can be performed. Here, the image that a viewer is supposed to see in the first direction is, for example, an image in three-dimensional display that a viewer is supposed to see with the left eye. The image that a viewer is supposed to see in the second direction is, for example, an image in three-dimensional display that the viewer is supposed to see with the right eye.

The ninth configuration is any one of the first to eighth configurations modified so that the display unit further includes a conversion unit that converts the gray scale level data into data of predetermined bits, and the correction unit corrects the gray scale level data using the data resulting from conversion by the conversion unit. In the ninth configuration, correction of gray scale level data is facilitated, even in the case where the gray scale level data are not a gray scale level value but, for example, a voltage value, a brightness value, or the like.

The tenth configuration is any one of the first to ninth configurations modified so that the separation unit is a parallax barrier that separates the plurality of images contained in the synthetic image so that the plurality of images are visible from different directions, respectively.

The eleventh configuration is any one of the first to ninth configurations modified so that the separation unit is a lenticular lens that separates the plurality of images contained in the synthetic image so that the plurality of images are visible from different directions, respectively.

The twelfth configuration is any one of the first to ninth configurations modified so that the separation unit is a liquid crystal lens that separates the plurality of images contained in the synthetic image so that the plurality of images are visible from different directions, respectively.

The thirteenth configuration is any one of the first to ninth configurations modified so that the separation unit is a partial retarder that separates the plurality of images contained in the synthetic image so that the plurality of images are visible from different directions, respectively.

Hereinafter, more specific embodiments of the present invention are explained with reference to drawings that show an example of the same. It should be noted that the drawings referred to hereinafter show, for convenience of explanation, only principal members necessary for the explanation of the present invention among the constituent members of the embodiments of the present invention are shown in a simplified manner. Therefore, the display device according to the present invention may include arbitrary constituent members that are not shown in the drawings that the present description refers to. Further, dimensions of members shown in each drawing do not faithfully reflect actual dimensions of constituent members and actual dimension ratios of the same.

[Embodiment]

FIG. 1 shows a display device 10 as an embodiment of the present invention. The display device 10 includes a display panel 12, a barrier unit 14, and a backlight 16.

The display panel 12 is a liquid crystal panel. The display panel 12 includes an active matrix substrate 18, a counter substrate 20, and a liquid crystal layer 22 sealed between these substrates 18 and 20. The active matrix substrate 18 includes a plurality of pixel electrodes (not shown). The pixel electrodes are arranged in matrix. The counter substrate 20 includes a common electrode (not shown).

Figure 2:
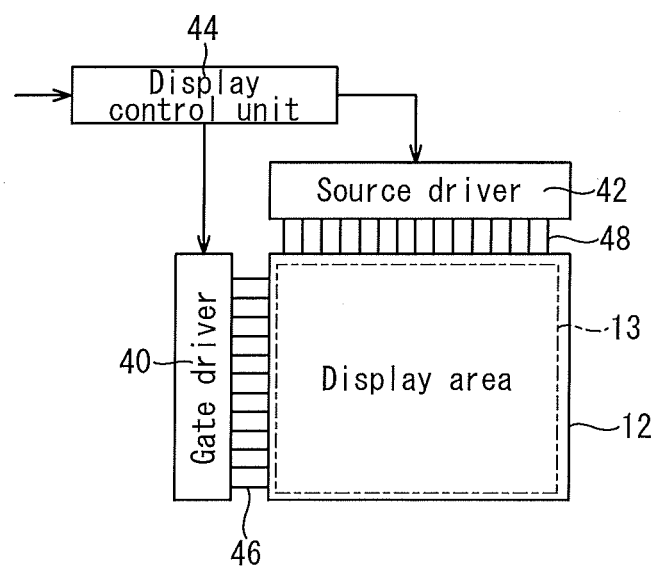
FIG. 2 is a block diagram showing an exemplary schematic configuration of a display unit.

The display panel 12 has a display area 13 (see FIG. 2). In the display area 13, a plurality of pixels are arranged in matrix. Each pixel includes a pixel electrode.

In the example shown in FIG. 1, columns of pixels R that display a right eye image, and columns of pixels L that display a left eye image are arranged alternately. In other words, in the example shown in FIG. 1, the right eye image and the left eye image are divided into pixel columns (in a stripe form). A synthetic image in which the pieces of the right eye image and the left eye image obtained by dividing the images in a stripe form are arranged alternately is displayed on the display panel 12.

Though not shown in the drawings, a color filter layer is formed on either one of the active matrix substrate 18 and the counter substrate 20. This imparts color properties to each pixel.

The backlight 16 is arranged on one side of the display panel 12 in the thickness direction. The backlight 16 includes a light source 24 and a reflection unit 26.

In the backlight 16, light emitted from the light source 24 is reflected by the reflection unit 26. As a result, light is projected to the display panel 12.

It should be noted that, the backlight 16 is not limited to the edge light type backlight shown in FIG. 1, but may be, for example, a direct backlight, a planar light source type backlight, or the like. Further, the light source 24 may be, for example, a cold-cathode tube, a light-emitting diode, or the like.

The barrier unit 14 is arranged on the other side of the display panel 12 in the thickness direction. It should be noted that the barrier unit 14 is arranged for performing light blocking/light transmission (separation of light projected from the backlight 16), and does not have to be arranged on the other side of the display panel 12 in the thickness direction. For example, the barrier unit 14 may be arranged between the display panel 12 and the backlight 16.

The barrier unit 14 includes a substrate 28. The substrate 28 is, for example, a glass substrate or the like.

The barrier unit 14 further includes a plurality of light-shielding layers 30. The light-shielding layer 30 is made of, for example, a photosensitive resin containing a black pigment.

The plurality of light-shielding layers 30 are formed in a stripe form so as to correspond to the columns of pixels R and L provided in the display panel 12. In other words, in the barrier unit 14, each light transmission slit 32 is formed between two adjacent light-shielding layers 30. In other words, the barrier unit 14 includes a parallax barrier 34 that serves as the separation unit in which the light-shielding layers 30 and the light transmission slits 32 are arrayed alternately.

Each light-shielding layer 30 blocks a part of light that has been emitted from the backlight 16 and has been transmitted by the display panel 12. This causes the columns of pixels R, which display the right eye image, to be observed by the right eye of a viewer, but not to be observed by the left eye of the viewer. Further, the columns of the pixels L, which display the left eye image, are caused to be observed by the left eye of the viewer, but not to be observed by the right eye of the viewer. As a result, the viewer is allowed to view a stereoscopic image.

Further, the barrier unit 14 includes a resin layer 36. The resin layer 36 is made of, for example, an ultraviolet curable resin, or the like.

The resin layer 36 is formed on the substrate 28. The resin layer 36 covers the light-shielding layers 30. The resin layer 36 bonds the barrier unit 14 and the display panel 12 with each other.

It should be noted that a polarizing plate 38a arranged on the active matrix substrate 18 in the present embodiment is bonded to the active matrix substrate 18, and a polarizing plate 38b arranged on the counter substrate 20 is bonded to the substrate 28.

Besides, as shown in FIG. 2, the display device 10 includes a gate driver 40, a source driver 42, and a display control unit 44, as the control unit of the display panel 12.

To the gate driver 40, a plurality of gate lines 46 are connected. These gate lines 46 are connected to gate electrodes (not shown) of thin film transistors (not shown) as switching elements, respectively. The thin film transistors are formed on the active matrix substrate 18. The gate lines 46 transmit scanning signals that are output from the gate driver 32. According to the scanning signals input to the gate electrodes, the thin film transistors are driven and controlled.

To the source driver 42, a plurality of source lines 48 are connected. These source lines 48 are connected to source electrodes (not shown) of the thin film transistors, respectively. The source lines 48 transmit display signals that are output from the source driver 42. When a display signal is input to the thin film transistor while the thin film transistor is being driven, charges according to the display signal are accumulated in an accumulation capacitor (not shown) connected to the thin film transistor. The accumulation capacitor is composed of a pixel electrode that is connected to a drain electrode (not shown) of the thin film transistor, a common electrode, and a portion of the liquid crystal layer 22 that is positioned between these electrodes. With charges according to the display signal being accumulated in the accumulation capacitor, the gray scale level of each pixel is controlled. As a result, an image is displayed on the display panel 12.

The display control unit 44 generates various types of signals necessary for image display, based on display data fed from the outside and timing signals, and outputs the same to the gate driver 40 and the source driver 42. The above-described synthetic image is generated by the display control unit 44.

In other words, in the present embodiment, the display panel 12 and the control unit of the display panel 12 (the gate driver 40, the source driver 42, and the display control unit 44) form a display unit.

Figure 3:
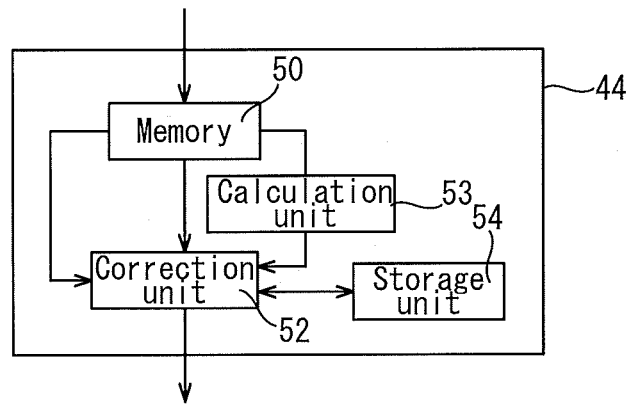
FIG. 3 is a block diagram showing an exemplary schematic configuration of a display control unit.

The display control unit 44 includes a memory 50, a correction unit 52, a calculation unit 53, and a storage unit 54, as shown in FIG. 3.

The memory 50 temporarily stores display data fed from outside. In the example shown in FIG. 3, the display control unit 44 includes one memory, but the display control unit 44 may have two memories, for example. In this case, one of the memories temporarily stores display data for displaying a left eye image. The other memory temporarily stores display data for displaying a right eye image. The display control unit 44 may have no memory.

The correction unit 52 corrects gray scale level data (a gray scale level value in the present embodiment) of pixels that display an image that a viewer is supposed to see, among a plurality of images contained in the synthetic image. This suppresses the occurrence of crosstalk. The crosstalk is a phenomenon that among a plurality of images contained in a synthetic image, an image other than an image that a viewer is supposed to see is visible to the viewer. The crosstalk occurs due to, for example, multiple reflection between layers in the display device 10, light leakage through the light-shielding layers 30 of the parallax barrier 34, and the like.

The correction unit 52 corrects gray scale level data of a pixel that displays an image that a viewer is supposed to see by using the following equation (1'):

$$I_{OLn} = I_{Ln} + (C+1) \times (I_M - I_{Ln} - I'_{Rn} - 1)/(I_M + 1) \qquad (1')$$

Here, $I_{OLn}$ represents gray scale level data of a pixel $L_n$ after correction. $I_{Ln}$ represents gray scale level data of the pixel Ln. C represents a crosstalk level. $I_M$ represents a maximum value of gray scale level data of the pixel Ln. I'$_{Rn}$ represents gray scale level data (factor gray scale level data) of a pixel that is a factor that causes crosstalk. For example, in the case of 256 gray scale levels, I$_{OLn}$, I$_{Ln}$, I'$_{Rn}$ and C are in a range of 0 to 255 each, and I$_M$ is 255.

The factor gray scale level data are generated, for example, based on gray scale level data of a pixel (pixel serving as a factor that causes crosstalk) that displays an image other than an image that a viewer is supposed to see, among a plurality of images contained in a synthetic image. The factor gray scale level data are generated by the calculation unit 53. The pixel serving as a factor that causes crosstalk is different depending on, for example, the positional relationship between the light-shielding layer and the light transmission slits that the parallax barrier has. In the present embodiment, a parallax barrier 34 in which the light-shielding layers 30 and the light transmission slits 32 are alternatively formed in the horizontal direction of the display screen (display area 13) of the display device 10 is used. Therefore, the pixels serving as factors that cause crosstalk are pixels that are positioned adjacent on both sides in the horizontal direction of the display screen (display area 13) of the display device 10 with respect to the pixels displaying an image that a viewer is supposed to see. In other words, in the present embodiment, pixels serving as factors that cause crosstalk are pixels adjacent on both sides in the row direction with respect to the pixels displaying an image that a viewer is supposed to see, among the pixels formed in matrix.

Figure 4:
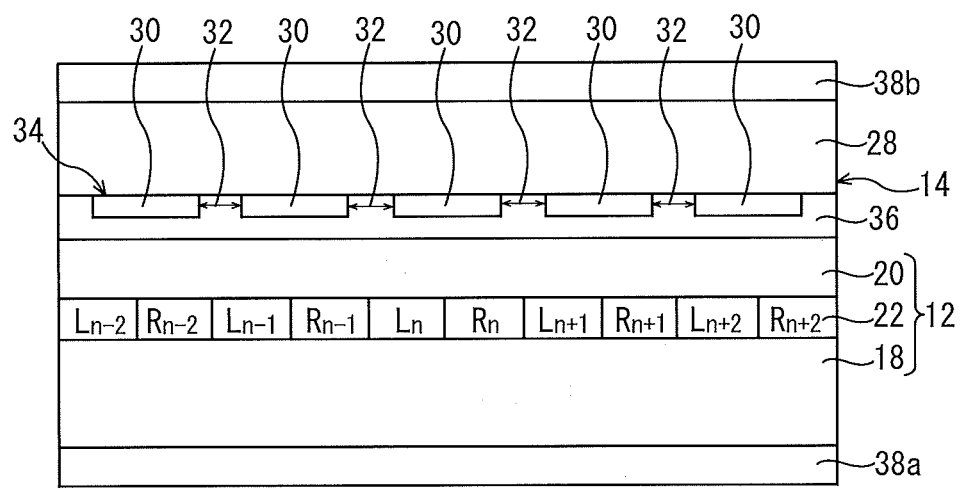
FIG. 4 is a schematic diagram for explaining pixels serving as factors that cause crosstalk.

For example, with respect to the pixel Ln shown in FIG. 4, the pixel R$_{n-1}$ and the pixel R$_n$ positioned adjacent to the pixel Ln are factors that cause crosstalk. Factor gray scale level data I'$_{Rn}$ used when crosstalk occurring to the pixel L$_n$ is correct are determined by, for example, the following equation (2):

$$I'_{Rn}=(I_{Rn-1}+I_{Rn})/2 \tag{2}$$

Here, I$_{Rn-1}$ represents gray scale level data of the pixel R$_{n-1}$. I$_{Rn}$ represents gray scale level data of the pixel Rn. In the case of, for example, 256 gray scale levels, I$_{Rn-1}$ and I$_{Rn}$ are in a range of 0 to 255 each.

In the case where each pixel has a plurality of subpixels (for example, a red pixel, a green pixel, and a blue pixel), the factor gray scale level data and the gray scale level data after correction are generated for each subpixel.

Figures 5, 6:
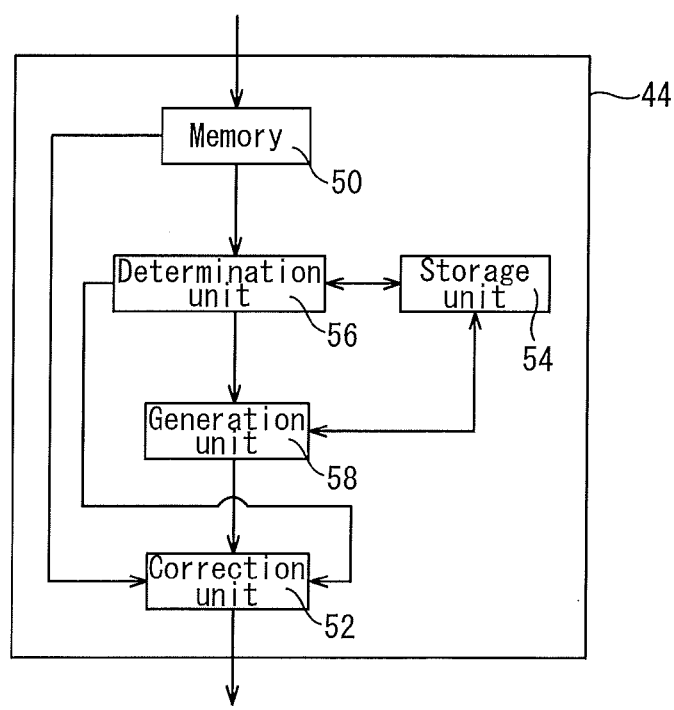
FIG. 5 is a table showing an exemplary relationship between combinations of gray scale level data and crosstalk levels.
FIG. 6 is block diagram showing another exemplary schematic configuration of the display control unit.

The storage unit 54 stores a plurality of crosstalk levels. The respective crosstalk levels are set according to combinations of gray scale level data of pixels displaying an image that a viewer is supposed to see (gray scale level data as a correction target) and factor gray scale level data (combinations of gray scale level data), respectively. FIG. 5 shows a table that shows an exemplary relationship between combinations of gray scale level data and crosstalk levels. The storage unit 54 stores such a table as shown in FIG. 5.

The correction unit 52 reads a crosstalk level that corresponds to a combination of gray scale level data of pixels displaying an image that a viewer is supposed to see and factor gray scale level data (combinations of gray scale level data), from the storage unit 54. The correction unit 52 corrects the gray scale level data by using the crosstalk level read out of the storage unit 54. This allows optimal crosstalk correction to be performed. As a result, further improvement of the display quality can be achieved.

The above-described equations (1') and (2) are used when the gray scale level data of the pixel L that displays a left eye image are to be corrected. Equations for correcting the gray scale level data of the pixel R that displays a right eye image are obtained by only replacing "R" and "L" with each other in the equations (1') and (2). Detailed explanation is omitted about the case where the gray scale level data of the pixel R that displays a right eye image are corrected.

The following description explains how the equation (1') is derived, in order to show the contents expressed by the equation (1').

First of all, let the crosstalk ratio be F, and then, the gray scale level data of pixels that are viewed by the left eye are expressed by the following equation (3):

$$I_L+(F \times I_R) \tag{3}$$

Here, I$_L$ represents a portion that results from gray scale level data I$_L$ of the pixels L displaying a left eye image, out of the gray scale level data of the pixels viewed by the left eye. F×I$_R$ represents a portion that results from crosstalk, out of the gray scale level data of the pixels viewed by the left eye. In other words, F×I$_R$ is a product obtained by multiplying the gray scale level data I$_R$ of the pixels R that display the right eye image by the crosstalk ratio F. F is in a range of 0 to 1.

Each display device 10 has its own F different from another, depending on, for example, the pitch between two adjacent light-shielding layers 30, 30 in the parallax barrier 34, the shape of the light-shielding layer 30, the material of the light-shielding layers 30, the positions where the light-shielding layers 30 are formed, the width of the light-shielding layer 30, the thickness of the light-shielding layer 30, the position relationship between the light-shielding layers 30 and the pixels R and L, etc. F can be determined by measurement for each display device 10. As a method for determining F, for example, the following method can be used, in the case where, for example, F is measured regarding a combination of gray scale level data in the case where pixels displaying a left eye image has a gray scale level value of 0 and pixels displaying a right eye image has a gray scale level value of 255: measuring the brightness of pixels viewed by the left eye when the pixels displaying the left eye image are displayed in black and the pixels displaying the right eye image are displayed in white; measuring the brightness of the pixels viewed by the left eye when both of the pixels displaying the left eye image and the pixels displaying the right eye image are displayed in black; and calculating F from difference between the brightnesses. F may be determined based on brightnesses measured at the center of the area 13, or alternatively, based on values of brightnesses measured at a plurality of positions in the area 13.

F may be expressed as C/I$_M$. Let F be expressed as C/I$_M$, and then, the equation (3) is given as:

$$I_L+(C/I_M) \times I_R \tag{3'}$$

In order to correct the gray scale level data of the pixels viewed by the left eye, which are expressed by the equation (3'), the correction as expressed by the following equation (4) has to be made. This intends to subtract a portion that results from influences of crosstalk preliminarily to correct the gray scale level data having been influenced by the crosstalk, so that the gray scale level data that are supposed to be displayed are obtained.

$$I_L-(C/I_M) \times I_R+(C/I_M) \times I_R=I_L \tag{4}$$

Therefore, the gray scale level data after correction can be expressed as the following equation (5):

$$I_L-(C/I_M) \times I_R \tag{5}$$

Here, in order to prevent the gray scale level data after correction from becoming negative, it is necessary to raise the gray scale level by C preliminarily. In other words, the range of the gray scale level data has to be changed to C to I$_M$. For example, in the case of 256 gray scale levels, the range of the gray scale level data has to be changed to C to 255. Let the result of raising $I_L$ by C be Ib, and Ib can be expressed by the following equation (6):

$$Ib = I_L \times ((I_M - C)/I_M) + C \tag{6}$$

Therefore, the gray scale level data $I_O$ after correction are obtained by substituting Ib of the equation (6) into $I_L$ of the equation (5), which are expressed by the following equation (7):

$$I_O = Ib - (C/I_M) \times I_R = (I_M \times I_L - C \times I_L - C \times I_R)/I_M + C \tag{7}$$

Here, in order to avoid complication of circuits in the case where calculation is carried out by hardware, the equation (7) is approximated. Then, the equation (7) is transformed to:

$$I_O + 1 = ((I_M+1) \times (I_L+1) - (C+1) \times (I_L+1) - (C+1) \times (I_R+1))/(I_M+1) + (C+1) \tag{7'}$$

The approximation of the equation (7) is carried out by adding 1 to $I_O$, $I_M$, $I_L$, $I_R$ and C.

Calculation of the equation (7') gives:

$$I_O + 1 = I_L + 1 + (C+1) \times (I_M - I_L - I_R - 1)/(I_M+1) \tag{8}$$

The equation for determining $I_O$ from the equation (8) is given as:

$$I_O = I_L + (C+1) \times (I_M - I_L - I_R - 1)/(I_M+1) \tag{9}$$

Here, in the case of 256 gray scale levels, $I_M + 1$ is 256. Therefore, the equation (9) can be expressed as follows:

$$I_O = I_L + (C+1) \times (I_M - I_L - I_R - 1) >> 8 \tag{10}$$

In the equation (10), ">>8" means right shift by 8 bits (division by 256).

The gray scale level data corrected by the correction unit 52 are expressed by the equation (9) or the equation (10). The factor gray scale level data are $I_R$ included in the second term of the equation (9) or the equation (10).

The above-described equations (3) to (10) are the questions in the case where the gray scale level data of the pixel L that displays a left eye image are corrected. Equations for correcting the gray scale level data of the pixel R that displays a right eye image are obtained by only replacing "R" and "L" with each other in the equations (3) to (10). Detailed explanation is omitted about the case where the gray scale level data of the pixel R that displays a right eye image are corrected.

[Application Example 1 of Embodiment]

As shown in FIG. 6, the display control unit 44 may include a determination unit 56 and a generation unit 58.

The determination unit 56 determines whether a crosstalk level corresponding to a combination of gray scale level data of pixels displaying an image that a viewer is supposed to see (gray scale level data as a correction target) and factor gray scale level data (a combination of gray scale level data) is stored in the storage unit 54.

In the case where the crosstalk level corresponding to the combination of gray scale level data is stored in the storage unit 54, the determination unit 56 reads out the crosstalk level stored in the storage unit 54. The determination unit 56 provides the crosstalk level read out of the storage unit 54 to the correction unit 52. The correction unit 52 corrects the gray scale level data using the crosstalk level provided by the determination unit 56.

In the case where no crosstalk level corresponding to the combination of gray scale level data is stored in the storage unit 54, the determination unit 56 transmits the determined combination of gray scale level data to the generation unit 58. The generation unit 58 generates a crosstalk level by referring to the crosstalk levels stored in the storage unit 54.

Figure 7:
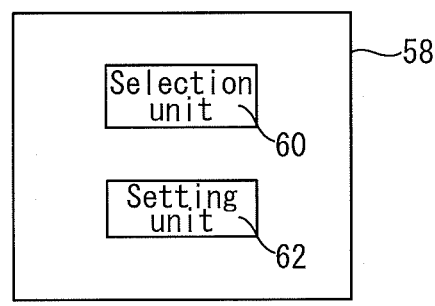
FIG. 7 is a block diagram showing another exemplary schematic configuration of the generation unit.

The generation unit 58 includes the selection unit 60 and the setting unit 62, as shown in FIG. 7.

The selection unit 60 selects, for example, the combination of gray scale level data closest to the combination of gray scale level data determined by the determination unit 56, from the combinations of gray scale level data stored in the storage unit 54.

The setting unit 62 reads the crosstalk level corresponding to the combination of gray scale level data selected by the selection unit 60, from the storage unit 54. The setting unit 62 sets the crosstalk level read out of the storage unit 54, as the crosstalk level corresponding to the combination of gray scale level data determined by the determination unit 56.

The generation unit 58 provides the crosstalk level thus set by the setting unit 62 to the correction unit 52. The correction unit 52 corrects the gray scale level data by using the crosstalk level provided by the generation unit 58.

Here, the combination of gray scale level data closest to the combination of gray scale level data determined by the determination unit 56 refers to, for example, such a combination of gray scale level data that the difference between the gray scale level data that the determination unit 56 determines to be a correction target and the gray scale level data as a correction target stored in the storage unit 54 (the difference between gray scale level data as correction targets) is the minimum, and that the difference between the factor gray scale level data determined by the determination unit 56 and the factor gray scale level data stored in the storage unit 54 (the difference between the factor gray scale level data) is the minimum. "The difference is the minimum" includes a case where the difference is zero.

The method whereby the generation unit 58 generates the crosstalk level is not limited to the method mentioned above.

For example, the selection unit 60 selects a plurality of combinations of gray scale level data close to the combination of the gray scale level data determined by the determination unit 56, from the combinations of gray scale level data stored in the storage unit 54.

The setting unit 62 reads crosstalk levels corresponding to these combinations of gray scale level data, out of the storage unit 54. The setting unit 62 sets a value calculated by using the crosstalk levels read out of the storage unit 54, as the crosstalk level corresponding to the combination of gray scale level data determined by the determination unit 56. For example, the setting unit 62 sets an average value of crosstalk levels read out of the storage unit 54 as the crosstalk level corresponding to the combination of gray scale level data determined by the determination unit 56.

The generation unit 58 provides the crosstalk level set by the setting unit 62 to the correction unit 52. The correction unit 52 corrects the gray scale level data by using the crosstalk level provided by the generation unit 58.

Here, the combination of gray scale level data close to the combination of gray scale level data determined by the determination unit 56 refers to, for example, such a combination of gray scale level data that the difference between the gray scale level data as correction targets is the minimum and that the difference between the factor gray scale level data is minimum, as well as such a combination of gray scale level data that the difference between the gray scale level data as correction targets is the second minimum and that the difference between the factor gray scale level data is the second minimum. "The difference is the minimum" includes a case where the difference is zero.

In the present application example, not all of crosstalk levels corresponding to all of the combinations of gray scale level data, respectively, have to be stored in the storage unit

54. As a result, the number of crosstalk levels stored in the storage unit 54 can be decreased.

In the example shown in FIG. 6, the display control unit 44 does not include the calculation unit 53. In the example shown in FIG. 6, the correction unit 52 generates factor gray scale level data.

[Application Example 2 of Embodiment]

Figure 8:
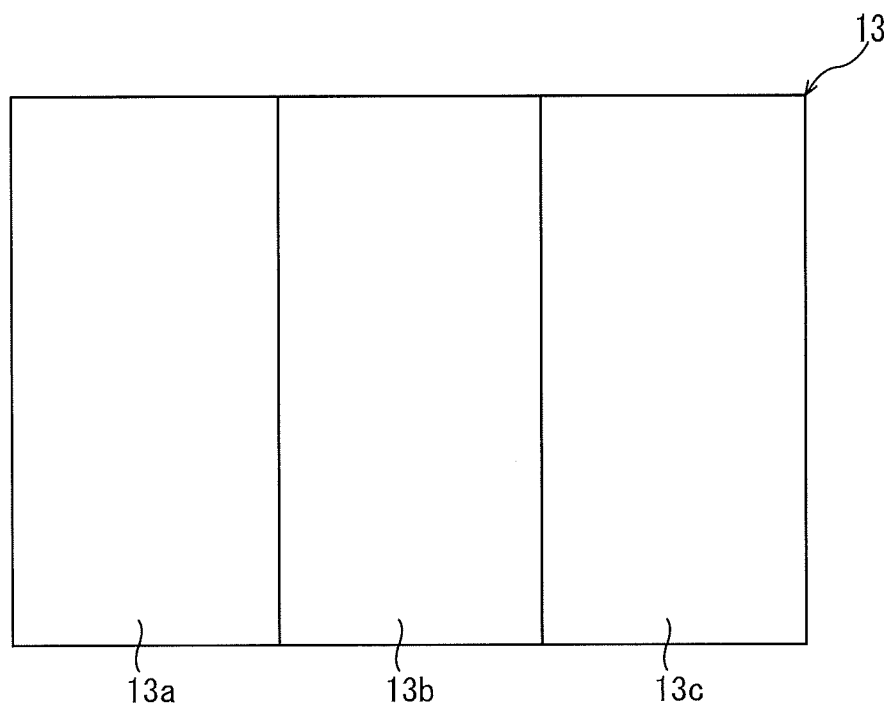
FIG. 8 schematically shows a display area.

In the present application example, as shown in FIG. 8, the display area 13 is divided into three areas 13*a*, 13*b*, and 13*c*. Tables as shown in FIG. 5 are provided so as to correspond to the areas 13*a*, 13*b*, and 13*c*, respectively. The storage unit 54 stores the tables provided corresponding to the areas 13*a*, 13*b*, and 13*c*.

Figure 9:
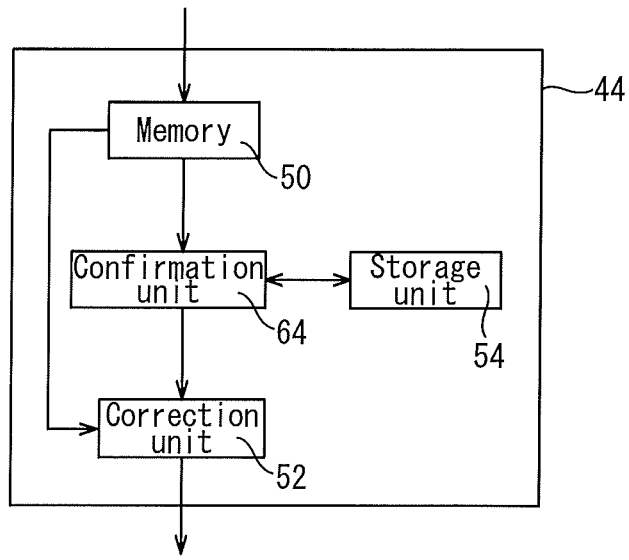
FIG. 9 is a block diagram showing still another exemplary schematic configuration of the display control unit.

In the present application example, as shown in FIG. 9, the display control unit 44 further includes a confirmation unit 64. The confirmation unit 64 confirms in which one of the three areas 13*a*, 13*b*, and 13*c* the pixels exists, the pixels displaying an image that a viewer is supposed to see, among a plurality of images contained in a synthetic image. The confirmation unit 64 confirms in which one of the areas 13*a*, 13*b*, 13*c* the pixels exist that display an image that a viewer is supposed to see, for example, based on address data that show positions of the pixels in the display area 13. The confirmation unit 64, after confirming the area where the pixels displaying an image that a viewer is supposed to see exist, selects a crosstalk level, by using a table corresponding to the area. The confirmation unit 64 reads the selected crosstalk level out of the storage unit 54. The confirmation unit 64 provides the crosstalk level read out of the storage unit 54 to the correction unit 52. The correction unit 52 corrects the gray scale level data by using the crosstalk level provided by the confirmation unit 64.

In the example shown in FIG. 9, the display control unit 44 does not include the calculation unit 53. In the example shown in FIG. 9, the correction unit 52 generates factor gray scale level data.

[Application Example 3 of Embodiment]

In the present application example, two tables as shown in FIG. 5 are provided. One of the tables stores crosstalk levels corresponding to combinations of gray scale level data of pixels displaying images that a viewer is supposed to see with the left eye (images that a viewer is supposed to see in a first direction) and factor gray scale level data thereof. A crosstalk level selected by using the one table (first crosstalk level) is used for correcting gray scale level data of pixels displaying an image that a viewer is supposed to see with the left eye (left eye image). The other table stores crosstalk levels corresponding to combinations of gray scale level data of pixels displaying images that a viewer is supposed to see with the right eye (images that a viewer is supposed to see in a second direction) and factor gray scale level data thereof. A crosstalk level selected by using the other table (second crosstalk level) is used for correcting gray scale level data of pixels displaying an image that a viewer is supposed to see with the right eye (right eye image).

[Application Example 4 of Embodiment]

In the present application example, as shown in FIG. 8, the display area 13 is divided into three areas 13*a*, 13*b*, and 13*c*. Tables as shown in FIG. 5 are provided so as to correspond to the areas 13*a*, 13*b*, and 13*c*, respectively. Two tables are provided for each of the areas 13*a*, 13*b*, and 13*c*. One of the tables stores crosstalk levels corresponding to combinations of gray scale level data of pixels displaying images that a viewer is supposed to see with the left eye (images that a viewer is supposed to see in a first direction) and factor gray scale level data thereof. A crosstalk level selected by using the one table (first crosstalk level) is used for correcting gray scale level data of pixels displaying an image that a viewer is supposed to see with the left eye (left eye image). The other table stores crosstalk levels corresponding to combinations of gray scale level data of pixels displaying images that a viewer is supposed to see with the right eye (images that a viewer is supposed to see in a second direction) and factor gray scale level data thereof. A crosstalk level selected by using the other table (second crosstalk level) is used for correcting gray scale level data of pixels displaying an image that a viewer is supposed to see with the right eye (right eye image).

[Application Example 5 of Embodiment]

Figure 10:
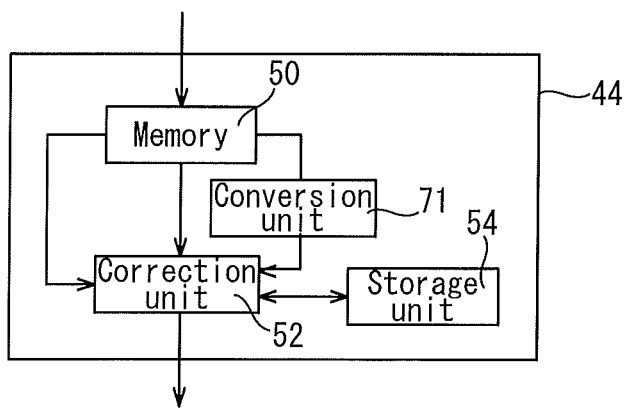
FIG. 10 is a block diagram showing still another exemplary schematic configuration of the display control unit.

In the present application example, as shown in FIG. 10, the display control unit 44 includes a conversion unit 71. The conversion unit 71 makes it possible to, in the case the gray scale level data are not a gray scale level value but, for example, a voltage value or a brightness value, to deal with the voltage value or the brightness value as data of predetermined bits (for example, 10 bits or 16 bits), so as to represent 256 gray scale levels (8 bits). The correction unit 52 corrects the gray scale level data by using the data changed by the conversion unit 71. In the example shown in FIG. 11, the display control unit 44 does not include the calculation unit 53. In the example shown in FIG. 10, the correction unit 52 generates factor gray scale level data.

[Application Example 6 of Embodiment]

Figure 11:
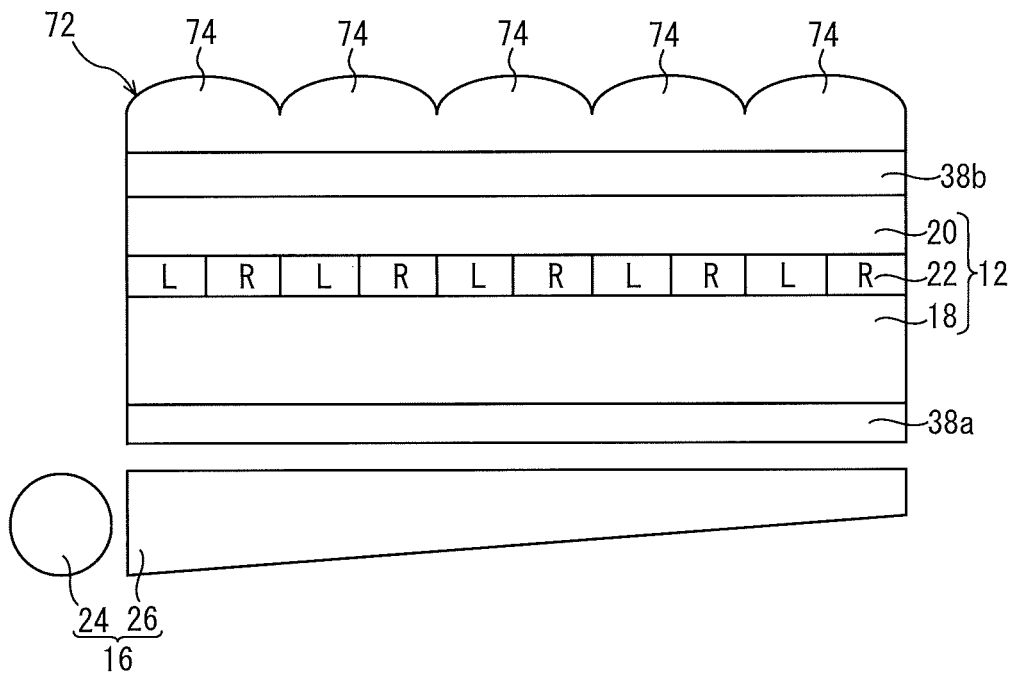
FIG. 11 schematically shows another exemplary schematic configuration of the display device.

In the present application example, as shown in FIG. 11, a lenticular lens 72 as a separation unit is provided in place of the barrier unit 14. The lenticular lens 72 has a plurality of cylindrical lenses 74. The cylindrical lenses 74 are arranged in a direction in which the columns of the pixels R and the columns of the pixels L are arrayed alternately. The lenticular lenses 72 are bonded on the polarizing plate 38*b*. Here, the cylindrical lenses 74 are arranged at positions corresponding to the columns of the pixels R and L. It should be noted that, in the present application example, the polarizing plate 38*b* is bonded on the counter substrate 20.

[Application Example 7 of Embodiment]

Figure 12:
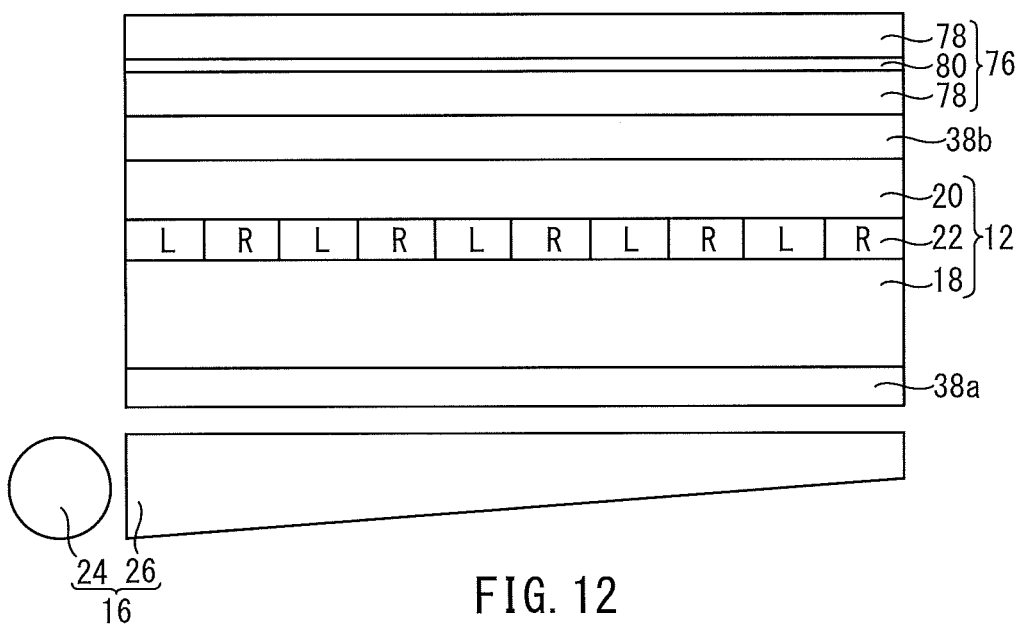
FIG. 12 schematically shows still another exemplary schematic configuration of the display device.

In the present application example, as shown in FIG. 12, a liquid crystal panel 76 is provided in place of the barrier unit 14. The liquid crystal panel 76 includes a pair of substrates 78, 78, and a liquid crystal layer 80 sealed between the same. A voltage is applied across the substrates 78, 78. This causes the refractive index of the liquid crystal layer 80 to change partially. As a result, a plurality of pseudo lenses (liquid crystal lenses) are formed in the liquid crystal layer 80. The lenses are formed in a direction in which the columns of pixels R and the columns of pixels L are arrayed alternately. The lenses are arranged at positions corresponding to the columns of the pixels R and L. The pseudo lenses formed in the liquid crystal layer 80 function as the separation unit.

[Application Example 8 of Embodiment]

Figure 13:
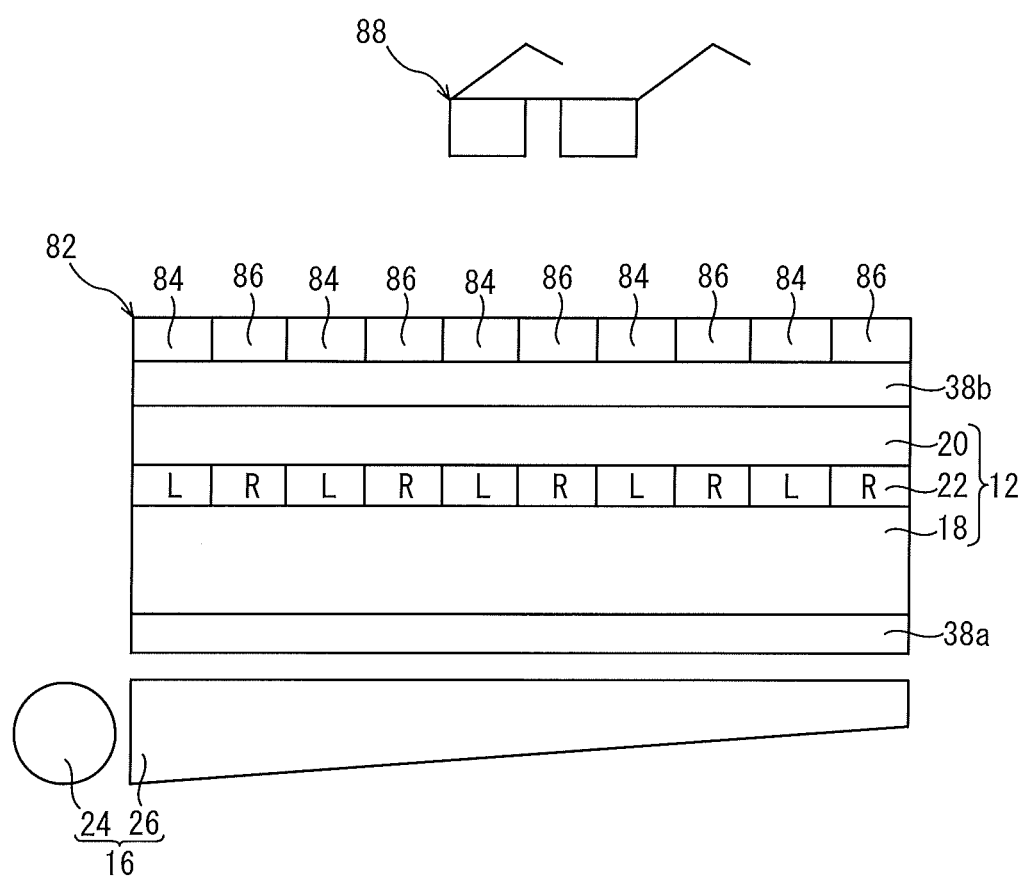
FIG. 13 schematically shows still another exemplary schematic configuration of the display device.

In the present application example, as shown in FIG. 13, a partial retarder 82 as the separation unit is arranged in place of the barrier unit 14. In other words, the present application example relates to a polarization-glass-type three-dimensional display device.

The partial retarder 82 includes a plurality of phase difference units 84 and a plurality of non-phase difference units 86. The phase difference units 84 and the non-phase difference units 86 are arrayed alternately. The phase difference unit 84 is a ½ wavelength plate, and rotates the polarization direction of incident light (linearly polarized light) by 90 degrees.

In the present application example, the pixels L displaying the left eye image are visible to a viewer through the phase difference units 84, and the pixels R displaying the right eye image are visible to the viewer through the non-phase difference units 86. The viewer only has to use the polarization glasses 88 so as to view the left eye image with the left eye alone, and view the right eye image with the right eye alone.

So far Embodiments of the present invention have been described in detail, but these are merely examples and do not limit the present invention at all.

For example, a switching liquid crystal panel may be used in place of the barrier unit 14. The switching liquid crystal panel includes a pair of substrates, and a liquid crystal layer sealed between the pair of substrates. By applying a voltage across the pair of substrates, a parallax barrier (separation unit) is realized that has portions that transmit light (light transmission slits), and portions that blocks light (light-shielding layers). In the case where a switching liquid crystal panel is used, a planar image can be shown to a viewer when the parallax barrier is not realized. Further, in the case where a switching liquid crystal panel is used, a 3D display or a multiview display can be realized, even in the case where, for example, the orientation of the display device is changed from portrait (landscape) to landscape (portrait), in other words, whether the orientation of the display device is portrait or landscape.

The display panel may be, for example, a plasma display panel, an organic EL (Electro Luminescence) panel, an inorganic EL panel, or the like.

Pixels diagonally adjacent to pixels displaying an image that a viewer is supposed to see, for example, also may be regarded as the pixels serving as factors that could cause crosstalk.

The factor gray scale level data do not have to be average of gray scale level data of pixels positioned adjacent on both sides to pixels displaying an image that a viewer is supposed to see. For example, the data may be obtained by multiplying gray scale level data of pixels positioned adjacent on both sides to pixels displaying an image that a viewer is supposed to see by a crosstalk contribution rates, and adding these.

The present invention is of course applicable to a display device that displays different images in a plurality of directions, respectively, by using a common display screen.

The invention claimed is:

1. A display device comprising:
   a display unit configured to display a synthetic image formed by dividing each of a plurality of images that are different from one another and arraying the divisional images thus obtained in a predetermined order; and
   a separation unit configured to separate the plurality of images contained in the synthetic image,
   wherein the display unit includes:
   a storage unit configured to store crosstalk levels set with respect to respective combinations of gray scale level data including gray scale level data of a pixel displaying an image that a viewer is supposed to see, among the plurality of images contained in the synthetic image, and gray scale level data of a pixel serving as a factor that causes crosstalk; and
   a correction unit configured to correct the gray scale level data of the pixel displaying the image that a viewer is supposed to see, by using the crosstalk levels stored in the storage unit
   wherein the correction unit corrects gray scale level data of the pixel displaying the image that a viewer is supposed to see, by the following equation (1):

$$I_O = I_X + (C+1) \times (I_M - I_X - I_Y - 1)/(I_M + 1) \quad (1)$$

where
$I_X$ represents gray scale level data of a pixel displaying an image that a viewer is supposed to see,
$I_Y$ represents gray scale level data of a pixel serving as a factor that causes crosstalk,
$I_M$ represents a maximum value of the gray scale level data of the pixel displaying the image that a viewer is supposed to see,
C represents a crosstalk level, and
$I_O$ represents gray scale level data of the pixel after the correction.

2. The display device according to claim 1,
wherein the display unit further includes a calculation unit configured to calculate gray scale level data of a pixel serving as a factor that causes crosstalk, based on gray scale level data of a pixel adjacent to the pixel displaying the image that a viewer is supposed to see.

3. The display device according to claim 1,
wherein the display unit includes:
a determination unit configured to determine whether the crosstalk level corresponding to the combination of gray scale level data is stored in the storage unit; and
a generation unit configured, in a case where the determination unit determines that the crosstalk level corresponding to the combination of gray scale level data is not stored in the storage unit, to generate the crosstalk level by referring to the crosstalk levels corresponding to the combinations of gray scale level data stored in the storage unit.

4. The display device according to claim 3,
wherein the generation unit includes:
a selection unit configured to select a combination of gray scale level data closest to the combination of gray scale level data determined by the determination unit, from the combinations of gray scale level data stored in the storage unit; and
a setting unit configured to set the crosstalk level corresponding to the combination of gray scale level data selected by selection unit, as the crosstalk level corresponding to the combination of gray scale level data determined by the determination unit.

5. The display device according to claim 3,
wherein the generation unit includes:
a selection unit configured to select a plurality of combinations of gray scale level data close to the gray scale level data determined by the determination unit, from the combinations of gray scale level data stored in the storage unit; and
a setting unit configured to set a value calculated by using the crosstalk levels corresponding to the combinations of gray scale level data selected by the selection unit, as the crosstalk level corresponding to the combination of gray scale level data determined by the determination unit.

6. The display device according to claim 1,
wherein the display unit further includes:
a display panel configured to display the synthetic image; and
a confirmation unit configured to confirm in which area, among a plurality of areas formed in the display panel, a pixel exists that displays an image that a viewer is supposed to see,
wherein tables having the crosstalk levels corresponding to the combinations of gray scale level data are provided so as to correspond to the plurality of areas,
the storage unit stores the plurality of tables, and
the correction unit corrects gray scale level data of the pixel displaying the image that a viewer is supposed to see, by using the crosstalk level selected from the table corresponding to the area where the confirmation unit confirms the pixel displaying the image that a viewer is supposed to see exists, among the plurality of areas.

7. The display device according to claim 1,
wherein the crosstalk level is:
a first crosstalk level used for correcting gray scale level data of a pixel displaying an image that a viewer is supposed to see in a first direction; or
a second crosstalk level used for correcting gray scale level data of a pixel displaying an image that a viewer is supposed to see in a second direction.

8. The display device according to claim 1,
wherein the display unit further includes a conversion unit configured to convert the gray scale level data into data of predetermined bits, and
the correction unit corrects the gray scale level data using the data resulting from conversion by the conversion unit.

9. The display device according to claim 1,
wherein the separation unit is a parallax barrier that separates the plurality of images contained in the synthetic image so that the plurality of images are visible from different directions, respectively.

10. The display device according to claim 1,
wherein the separation unit is a lenticular lens that separates the plurality of images contained in the synthetic image so that the plurality of images are visible from different directions, respectively.

11. The display device according to claim 1,
wherein the separation unit is a liquid crystal lens that separates the plurality of images contained in the synthetic image so that the plurality of images are visible from different directions, respectively.

12. The display device according to claim 1,
wherein the separation unit is a partial retarder that separates the plurality of images contained in the synthetic image so that the plurality of images are visible from different directions, respectively.

\* \* \* \* \*